Oct. 27, 1959  E. C. CARLSON  2,909,988
RECIPROCATING CONVEYOR HAY CRUSHER
Filed Oct. 27, 1955  2 Sheets-Sheet 1
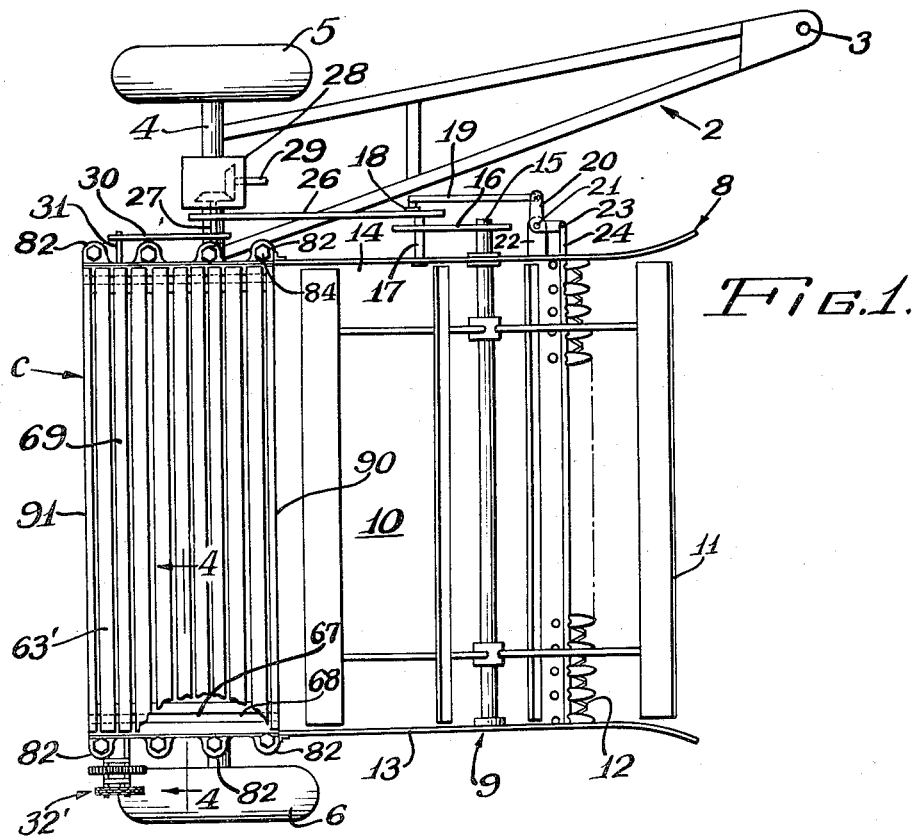
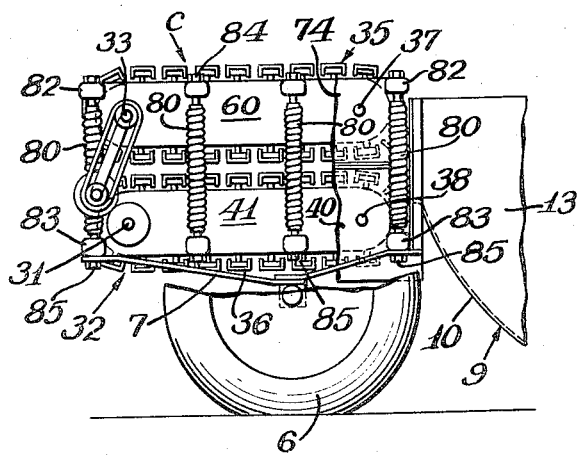
Inventor:
Ernest C. Carlson

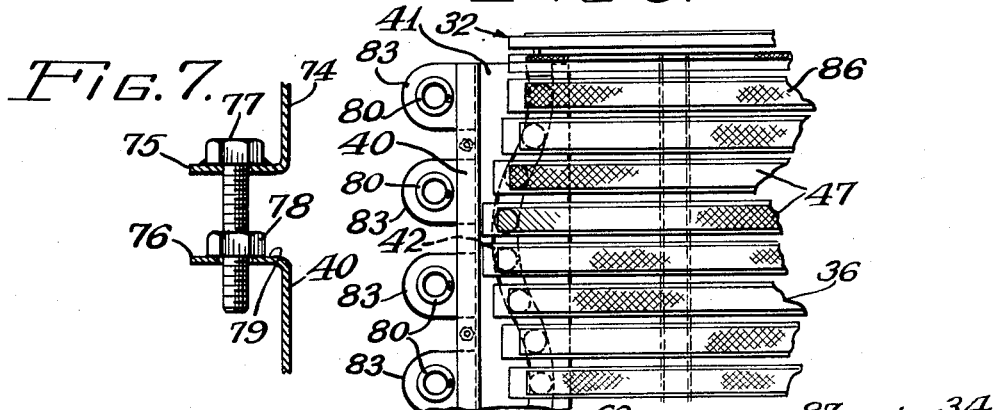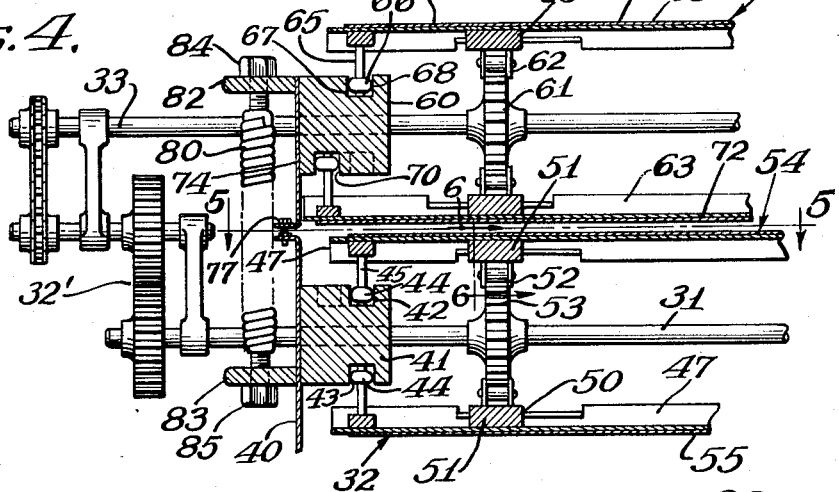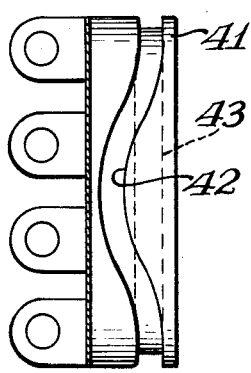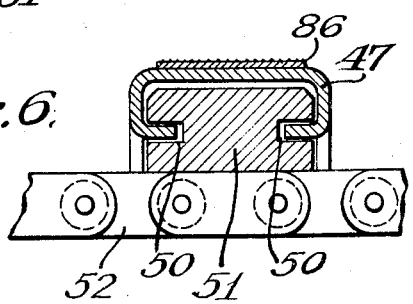

United States Patent Office 2,909,988
Patented Oct. 27, 1959

2,909,988

RECIPROCATING CONVEYOR HAY CRUSHER

Ernest C. Carlson, Wheaton, Ill., assignor to International Harvester Company, a corporation of New Jersey Application October 27, 1955, Serial No. 543,223

9 Claims. (Cl. 100—98)

This invention relates to hay processing machines and more particularly to a novel crushing machine.

Machines of the type under consideration normally comprise a pair of opposed crushing rollers, either or both of which may be corrugated and between which the hay is adapted to be passed pursuant to rotation of the rollers. It has been found that in machines of practical design the hay is passed between rollers which are of limited length so that the volume of hay being fed between the rollers forms a thick mat and in order to insure that all of the stems in this mat are crushed, it is necessary to exert tremendous pressures between the rollers and the crops on a line contact with the consequence that the device consumes an enormous amount of power.

In order to obviate these difficulties, it is an object of the invention to provide a novel crushing mechanism of a type wherein the unit pressures between the crushing means and the crops are substantially reduced.

A more specific object of the invention is to provide a novel crushing mechanism wherein the opposed crushing surfaces are in the form of endless conveyors comprising cross slats and the conveyors being elongated in the direction of flow of the material so that each particle of material is subjected to prolonged action by the crushing mechanism, and not to momentary line contact as obtained by the present crushing rollers.

A further object of the invention is to provide a novel crusher wherein the cross slats are reciprocated transversely to the direction of material movement and provided with material abrading surfaces whereby as the material is flowing lengthwise of the crushers it is bruised by being skin scuffed through the proposed lateral movement of the cross slats.

These and other objects of the invention will become more apparent from the specification and the drawings, wherein:

Figure 1 is a plan view of a harvesting machine incorporating the invention with portions broken away;

Figure 2 is a fragmentary side elevational view of the structure shown in Figure 1;

Figure 3 is an enlarged plan view of one of the tracks carrying the conveyor slats;

Figure 4 is an enlarged fragmentary sectional view taken substantially on the line 4—4 of Figure 1;

Figure 5 is a fragmentary plan view of the bottom crusher taken substantially on the line 5—5 of Figure 4;

Figure 6 is an enlarged cross sectional view taken substantially on the line 6—6 of Figure 4; and Figure 7 is a sectional view of the limiting stop shown in Figure 4 for controlling the spacing between the upper and lower crushing assemblies.

Describing the invention in detail, there is shown in Figure 1 a draft frame 2 which comprises a forward hitch point 3 adapted for connection to an associated motivating vehicle, such as a tractor. The hitch frame is connected at its rear extremity to a transverse axle structure 4 carrying wheels 5 and 6 at opposite ends. The axle structure 4 supports a side frame structure 7 adjacent to each end on which is supported a harvesting mechanism generally designated 8.

The harvesting mechanism 8 includes a platform structure 9 which has a curved bottom 10 over which a reel 11 is adapted to sweep in bringing the material, which is cut by the cutter bar assembly 12 at the leading edge of the bottom wall 10 to the crushing mechanism C. The platform structure includes upstanding side walls 13 and 14 which support the center shaft 15 of the reel 11 which may be driven by a belt and pulley drive 16 from a countershaft 17 which is suitably supported from the wall structure 14.

It will be seen that the shaft 17 is provided with a pulley and crank assembly 18 which drives a pitman 19 which, in turn, is adapted to rock the bell crank which is carried at 21 on the anchor 22 which is connected in a suitable manner to the platform structure 9, the bell crank being connected as at 23 to drive the knife blade 24 of the cutter bar assembly 12.

The crank wheel pulley 15 is driven by belt and pulley assembly 26 which is driven from a shaft 27 which, in turn, is driven from a gear box 28 carried by axle structure 4, the gear box being driven from an input shaft structure 29 which is adapted to be connected through the usual shaft structure to the power take-off of an associated tractor or to an engine if desired.

It will be seen that the shaft 27 also drives a pulley and belt transmission 30 which drives the shaft 31 (Fig. 4) of the lower crushing means generally designated 32.

The shaft 31 drives a reversing gear 32' which drives the rear shaft 33 of the upper crushing mechanism 34.

It will be seen that the upper and lower crushing mechanisms 34 and 32 are in the form of endless conveyors 35 and 36 (Fig. 2) and are carried at their forward ends on sprocketed shafts 37 and 38, respectively, and in identical manner as they are carried at their rear ends on the shafts 31 and 33, as best seen in Figure 4.

Referring now to the lower conveyor 36 it will be seen that it is provided at each side with a side plate 40 and that inwardly of the side plate there is disposed a cam block or track 41 which has an endless slot providing upper and lower groove portions 42 and 43. The upper groove portion, as best seen in Figure 3, is a generally sinusoidal curve, and the portion 43 is straight fore and aft. The groove 42, 43 receives the roller members 44 which are provided on the outer ends of the guides 45 which are anchored to the adjacent ends of slats 47 which collectively make up the conveyor 36.

It will be seen that the slats 47 extend lengthwise transversely of the direction of travel of the machine and of the flowing material and that they are each dovetailingly interlocked intermediate their ends as at 50 to anchor blocks 51 which are connected to a driving chain 52, the chain being trained about the sprocket 53 which is connected to the shaft 31. It will be seen thus that the slats 47 in the top run 54 (Fig. 4) of the lower crusher not only move from front to rear but also oscillate laterally in this run, and it will also be seen that in the return lower run 55 of the crusher conveyor 36 the slats move in a straight line in view of the straight fore and aft contour of the lower portion 43 of the groove.

Referring now to the upper crusher conveyor 34 it will be seen that the shaft 33 is provided adjacent to each cam block 60 with a sprocket 61 about which is trained an endless chain 62 and the chain being provided with a plurality of anchor blocks 63 spaced lengthwise about the chain on the order of the spacing of the cross slats 63' which are keyed thereto in the same manner as the slats 47 to the anchor blocks 51. It will also be seen that the slats 63' are provided with guides 65 adjacent to each end which at their inner ends are provided with roller bearing means 66 which travel in an endless path in a groove 67 which has a straight fore and aft extending upper portion 68 whereby the upper run 69 of the upper crusher conveyor 34 runs with its slats moving from the rear to the front without any lateral translational movement. The lower portion 70 of the slot 68 is curved in a substantially sinusoidal wave but its curvature is offset approximately 180° from the curvature of the opposed portion 42 of the bottom cam member 41, whereby the slats 63' in the lower run 72 of the upper crusher conveyor 34 are moving in a direction opposite to the opposed slats 47 in the upper run of the lower crusher conveying means 32. It will be seen that the cam blocks 60 are provided outwardly thereof with side plates 74 and that the plates 74, 40, as best seen in Figure 7 of the upper and lower conveyor sections are provided with outturned flanges 75, 76, respectively, which are disposed in superposed relationship and the upper flange 75 is provided with a bolt 77 which is welded thereto and the bolt having a nut 78 threaded thereon which overlies the upper side 79 of the flange 76 in order to limit the approach of the upper and lower crushing means 34 and 32 to each other attendant to their being drawn toward each other by a plurality of tension springs 80 which are anchored at their upper and lower ends to lugs 82 and 83 formed integral respectively with the upper block 60 and the lower cam blocks 40. It will be noted that the compression is adjustable by means of the threaded screw members 84 and 85 which are connected to the upper and lower ends respectively of the associated spring 80.

It will be noted that each slat 47 is provided with an abrasive element 86 on the outer side which, in the present instance, is a strip of abrasive material such as sandpaper or the like, but it will be readily appreciated that the same can be in the form of knurling or any means providing a friction or an abrading surface on the exterior side of the slat. Similarly, the upper slats 63 are provided with abrading means 87 which, in the present instance, is the same as the element 86 but, of course, may be of any form such as fluting or knurling or barbs, or anything suitable to abrade the hay passing in between.

In operation the unit is drawn through the field. The hay is cut by the mower 12 and propelled by the reel 11 over the bottom wall 10 to the intake nip 90 of a crushing mechanism. The material is passed between the upper and lower runs 54 and 72 and pressed by the springs 80 and rolled lateral by the slats 63' and 47 moving in opposite directions transversely to the direction of flow of the material. The material is then discharged at the discharge 91 onto the ground or, if desired, onto a laterally moving conveyor and windrowed.

What is claimed is:

1. A machine for crushing forage crops comprising a pair of endless assemblies presenting opposed stretches for receiving crops therebetween, said stretches being spaced a distance apart in crushing relation to a thin layer of crops therebetween, means for driving said assemblies for moving said stretches in a common direction, said stretches being elongated in the direction of movement thereof, and means urging said assemblies toward each other under pressure effective to crush the crops between said stretches, and said assemblies including a plurality of transverse crop-engaging members, and means responsive to movement of said assemblies for reciprocating said members transversely of the direction of movement of said stretches for rolling and scuffing crops entered therebetween.

2. A machine for crushing forage crops comprising a pair of endless assemblies presenting opposed stretches for receiving crops therebetween, said stretches being spaced a distance apart in crushing relation to a thin layer of crops therebetween, means for driving said assemblies for moving said stretches in a common direction, said stretches being elongated in the direction of movement thereof, and means urging said assemblies toward each other under pressure effective to crush the crops between said stretches, and said assemblies including a plurality of transverse crop-engaging members, and means responsive to movement of said assemblies for reciprocating said members transversely of the direction of movement of said stretches for rolling and scuffing crops entered therebetween, and said members having rough crop-engaging means.

3. A forage crop crushing unit comprising a support, a pair of endless assemblies movably mounted thereon in superposed relation, said assemblies presenting opposed lengths defining a narrow crop-receiving space therebetween and elongated in the direction of movement thereof, and means operatively associated with said assemblies and yieldably biasing the same in a direction urging said stretches toward each other into crushing engagement with crops entered therebetween, at least one of said assemblies having crop engaging portions movable laterally with respect to the direction for movement of said stretches and means for moving said portions transversely of said lengths, and means for moving said assemblies linearly along said lengths simultaneously with the movement of said portions transversely of said lengths.

4. In a forage crop crushing unit, support means, a pair of members disposed in opposing relationship rotatably mounted on said support means and presenting opposing mutually engaging crop-receiving sections movable with said members in a first direction, at least one of said sections having crop-scuffing portions movable in a direction angularly to said first direction, and means for concomitantly moving said portions as aforesaid.

5. In a forage crop crushing unit, support means, a pair of members disposed in opposing relationship rotatably mounted on said support means and presenting opposing mutually engaging crop-receiving sections movable with said members in a first direction, at least one of said sections having crop-scuffing portions movable in a direction angularly to said first direction, and means for concomitantly moving said portions as aforesaid and said last-mentioned means responsive to movement of said members in said first direction.

6. In a forage crop crushing unit, support means, a pair of members disposed in opposing relationship rotatably mounted on said support means and presenting opposing mutually engaging crop-receiving sections movable with said members in a first direction, at least one of said sections having crop-scuffing portions movable in a direction angularly to said first direction, and means for concomitantly moving said portions as aforesaid and said last-mentioned means responsive to movement of said members in said first direction and said last-mentioned means comprising cam means on said support means including an endless curvilinear track, and means on said portions in guided engagement with said track.

7. A hay crusher comprising a pair of endless belts, means mounting said belts with extensive linear portions thereof in opposed crop-crushing relation, means pressingly urging said belts toward each other along said portions for engaging crops entered therebetween, and said belts having crop-bruising segments movable transversely of the belts, said segments directly engaging the crops, and means for so moving said portions while the crops are being crushed therebetween.

8. The invention according to claim 7 and said portions being elongated transversely of the belts and movable rectilinearly and disposed on the periphery of the belt.

9. A forage crop crushing device comprising a pair of opposed rotatably mounted crushing elements defining a crushing area therebetween into which said crop is introduced in a predetermined path and therein crushed, at least one of said elements having a plurality of crop-abrading members movably mounted thereon and projecting into said area for contact with the crop therein and movable crosswise of said path of movement of the crop, and means for simultaneously reciprocating said members while moving said elements along said path.

References Cited in the file of this patent

UNITED STATES PATENTS

| | | |
|---|---|---|
| 1,414,212 | Samuelson | Apr. 25, 1922 |
| 2,179,937 | Lamp | Nov. 14, 1939 |
| 2,664,684 | Russell | Jan. 5, 1954 |

FOREIGN PATENTS

| | | |
|---|---|---|
| 572,324 | France | June 4, 1924 |
| 827,723 | Germany | Jan. 14, 1952 |